(12) United States Patent
Kotwicki et al.

(10) Patent No.: US 6,560,523 B2
(45) Date of Patent: *May 6, 2003

(54) ENGINE CONTROL SYSTEM FOR IMPROVED DRIVEABILITY

(75) Inventors: Allan Joseph Kotwicki, Williamsburg, MI (US); John D. Russell, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/144,461

(22) Filed: May 13, 2002

(65) Prior Publication Data

US 2002/0133281 A1 Sep. 19, 2002

Related U.S. Application Data

(63) Continuation of application No. 09/772,753, filed on Jan. 30, 2001, now Pat. No. 6,430,492, and a continuation of application No. 09/312,824, filed on May 17, 1999, now Pat. No. 6,199,004.

(51) Int. Cl.[7] .......................... B60K 41/04; B60K 41/08
(52) U.S. Cl. .......................... 701/54; 180/230; 477/33; 477/107

(58) Field of Search ................... 701/54, 53; 180/230; 477/33, 34, 35, 36, 107, 108, 110

(56) References Cited

U.S. PATENT DOCUMENTS

| | | | | |
|---|---|---|---|---|
| 5,016,175 A | * | 5/1991 | Baltusis et al. | 192/3.29 |
| 5,105,926 A | * | 4/1992 | Yoshimura et al. | 477/169 |
| 5,166,879 A | * | 11/1992 | Greene et al. | 477/125 |
| 5,403,245 A | * | 4/1995 | Watanabe et al. | 477/102 |
| 6,094,617 A | * | 7/2000 | Lapke | 123/350 |
| 6,188,943 B1 | * | 2/2001 | Uchida et al. | 192/3.54 |
| 6,226,593 B1 | * | 5/2001 | Kurz et al. | 701/301 |
| 6,430,492 B2 | * | 8/2002 | Kotwicki et al. | 701/54 |

* cited by examiner

Primary Examiner—William A. Cuchlinski, Jr.
Assistant Examiner—Olga Hernandez
(74) Attorney, Agent, or Firm—Allan J. Lippa; John D. Russell

(57) ABSTRACT

A vehicle and engine control system controls engine torque to maintain positive torque at a transmission input to minimize the transmission gears from separating. By maintaining a positive engine torque, operation of the transmission in or through the zero torque, or lash, zone, is minimized. This minimizes poor vehicle driveability that would otherwise result from operation in the lash zone. The control systems uses closed loop control based on a desired and actual turbine speed ratio, or slip ratio, to provide positive torque to the transmission.

5 Claims, 5 Drawing Sheets

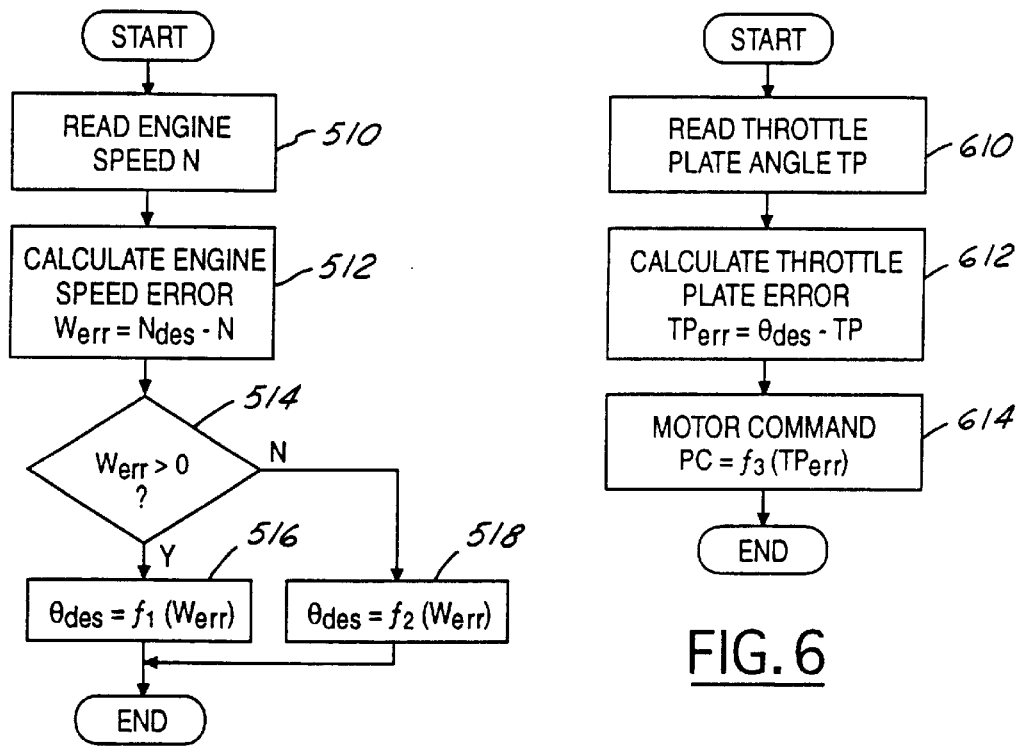
FIG. 5
FIG. 6
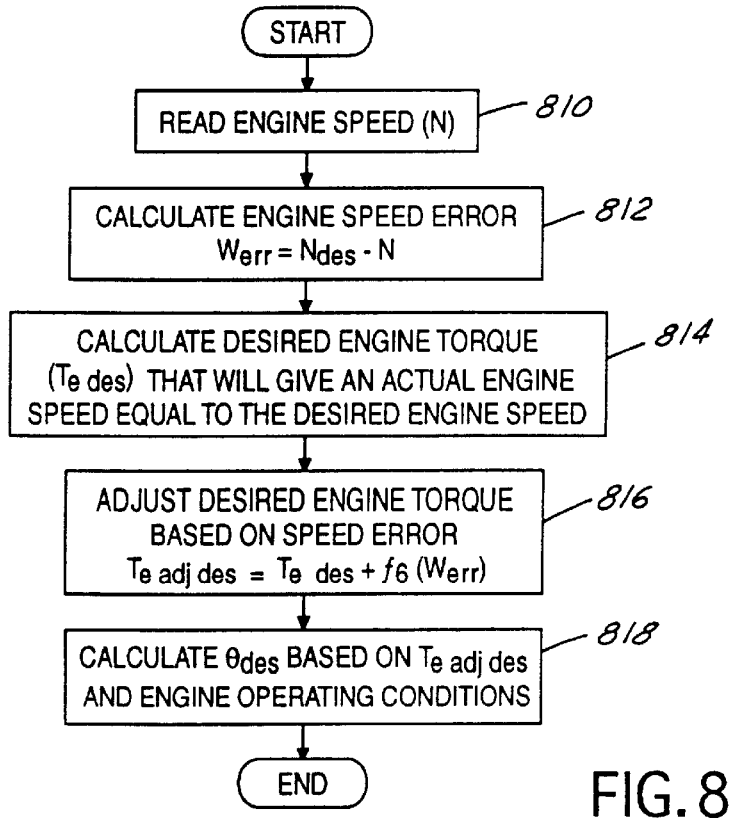
FIG. 8

ENGINE CONTROL SYSTEM FOR IMPROVED DRIVEABILITY

RELATED APPLICATION AND ISSUED PATENT

This patent application is related to co-pending application Ser. No. 09/772,753, filed Jan. 30, 2001, now U.S. Pat. No. 6,430,492, and to U.S. Pat. No. 6,199,004, issued Mar. 6, 2001; both assigned to the same assignee as the present application, the entire subject matter thereof being incorporated herein by reference.

This application claims the benefit of the filing date of U.S. Ser. No. 09/772,753, filed Jan. 30, 2001, now U.S. Pat. No. 6,430,492 which claims the benefit of U.S. Ser. No. 09/312,824, filed May 17, 1999, now U.S. Pat. No. 6,199,004. As such the present Continuation application claims the benefit of Ser. No. 09/772,753 and U.S. Ser. No. 09/312,824.

FIELD OF THE INVENTION

The present invention relates to a system and method to control an internal combustion engine coupled to a torque converter and in particular to adjusting engine output to control torque converter slip, or speed ratio.

BACKGROUND OF THE INVENTION

Internal combustion engines must be controlled in many different ways to provide acceptable driving comfort during all operating conditions. Some methods use engine output, or torque control where the actual engine torque is controlled to a desired engine torque through an output adjusting device, such as with an electronic throttle, ignition timing, or various other devices. In some cases, such as during normal driving conditions, the desired engine torque is calculated from the amount of depression of an accelerator pedal. In other conditions, such as idle speed control, the desired engine torque is calculated based on a speed error between actual engine speed and a desired engine speed. Some attempts have been made to use this torque control architecture to improve driveability during deceleration conditions, such as when a driver releases their foot to the minimum accelerator pedal position, known to those skilled in the art as a tip-out. During a tip-out, the driver is indicating a desire for reduced engine output.

One system that attempts to use speed control during deceleration conditions operates the engine in such a way as to maintain constant engine speed during slow moving or stopped conditions. In this system, the engine is controlled to a constant speed taking into account the loading from the torque converter. The loading from the torque converter is calculated based on the engine speed and turbine speed. Engine speed can be controlled to a constant level during deceleration to adsorb energy from the vehicle and assists in vehicle braking. Further, as turbine speed increases, the desired engine speed is reduced to provide even more engine braking. Such a system is described in D.E. 4321413A1.

The inventors herein have recognized a disadvantage with the above invention. In particular, the accelerator pedal is released and subsequently engaged, the prior art system exhibits poor driveability due transmission gears lash. For example, when the engine transitions from exerting a positive torque to exerting a negative torque (or being driven), the gears in the transmission separate at the zero torque transition point. Then, after passing through the zero torque point, the gears again make contact to transfer torque. This series of events produces an impact, or clunk, resulting in poor driveability and customer disatisfaction. In other words, the engine first exerts a positive torque through the torque converter onto the transmission input gears to drive the vehicle. Then, when using the prior art approach during deceleration, the engine is driven by the torque from the transmission through the torque converter. The transition between these to modes is the point where the engine is producing exactly zero engine brake torque. Then, at this transition point, the gears in the transmission separate because of inevitable transmission gear lash. When the gears again make contact, they do so dynamically resulting in an undesirable impact.

This disadvantage of the prior art is exacerbated when the operator returns the accelerator pedal to a depressed position, indicating a desire for increased engine torque. In this situation, the zero torque transition point must again be traversed. However, in this situation, the engine is producing a larger amount of torque than during deceleration because the driver is requesting acceleration. Thus, another, more severe, impact is experienced due to the transmission lash during the zero torque transition.

SUMMARY OF THE INVENTION

Problems of prior approaches overcome, by a vehicle control method for a vehicle having an internal combustion engine coupled to a torque converter coupled to a transmission, the method comprising the steps of: providing an indication when the torque converter is in an unlocked state and torque converter output speed is greater than torque converter input speed; and in response to said indication, adjusting an engine output amount based on said torque converter output speed and said torque converter input speed.

By adjusting engine output in response to an indication that the torque converter is in an unlocked state and torque converter output speed is greater than torque converter input speed, it is possible to provide real-time feedback control and maintain positive torque in the driveline. In other words, according to the present invention, it is possible to have an accurate indication of when the vehicle is near the vehicle lash zone. Further, it is possible to take control action to minimize the transmission lash.

Stated another way, the present invention utilizes the torque converter characteristics in the following way. Because these measurements are readily available, a simple controller can be developed that will provide positive torque application to the transmission. In the simplest form, according to the present invention, this amounts to controlling engine torque to keep the engine speed greater than the torque converter turbine speed. Thus, during tip-out conditions, driveability problems associated with traversing the zero torque lash point are avoided. Further, by using turbine speed to generate the desired engine speed, thus providing a positive torque, effects from road grade, vehicle mass, temperature, and other factors are inherently considered without complexity or addition computation.

An advantage of the above aspect of the invention is improved driveability.

Another advantage of the above aspect of the invention is improved customer satisfaction.

Another advantage of the above aspect of the invention is to minimize or ease transitions through the transmission lash zone.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein:

FIGS. 3–9 high level flowcharts of various routines for controlling the engine according to the present invention.

DESCRIPTION OF AN EMBODIMENT

Figure 1:
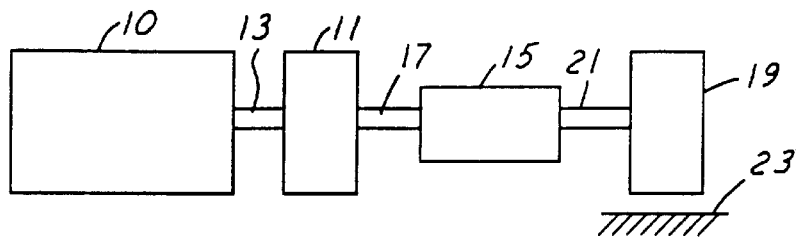
FIG. 1 is a block diagram of a vehicle illustrating various components related to the present invention.
Figure 2:
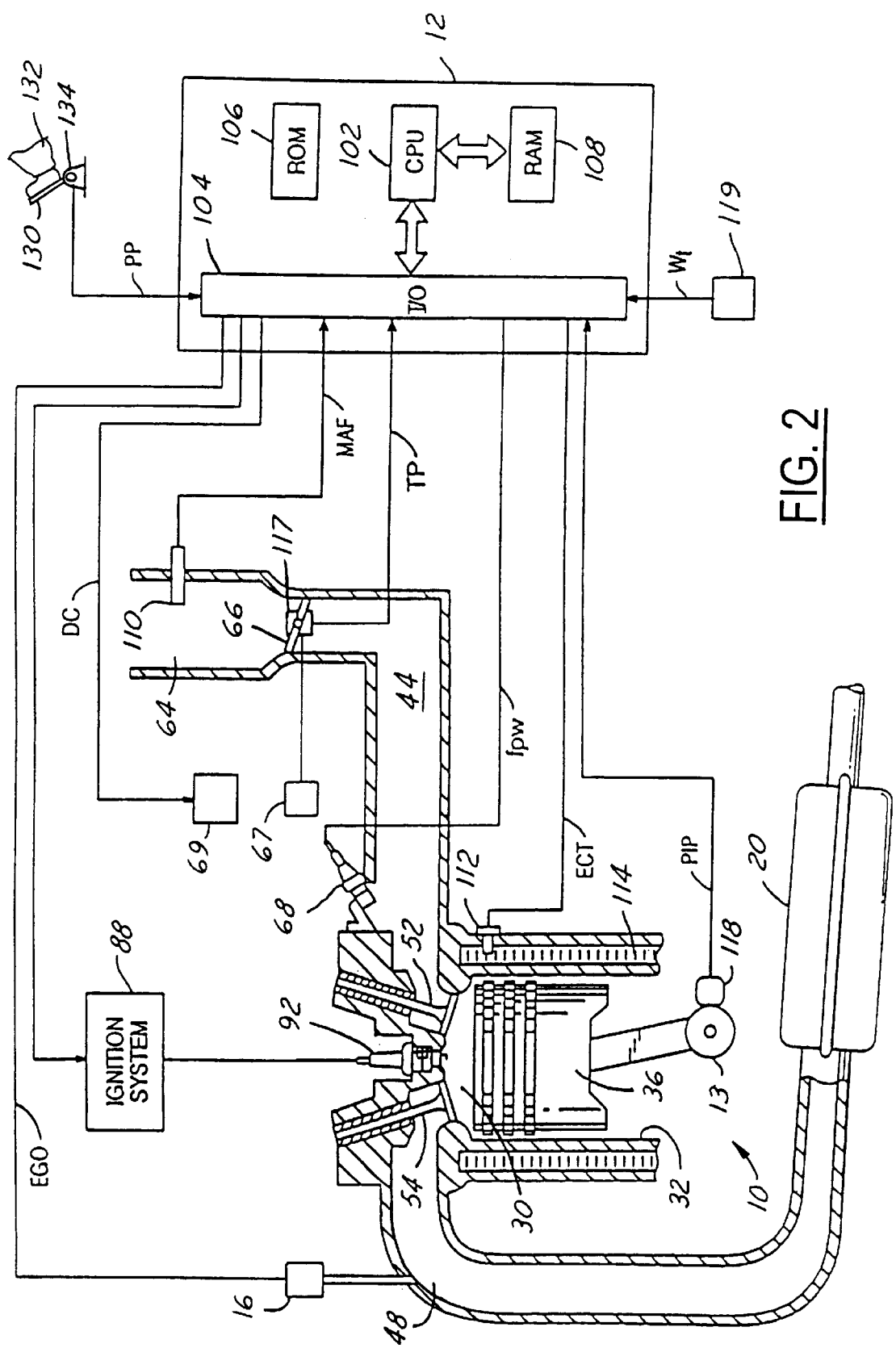
FIG. 2 is a block diagram of an engine in which the invention is used to advantage.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprise various other gears, such as, for example, a final drive ratio (not shown). Transmission 15 is also coupled to tire 19 via axle 21. Tire 19 interfaces the vehicle (not shown) to the road 23.

Internal combustion engine 10 comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating and engine speed (N).

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3:
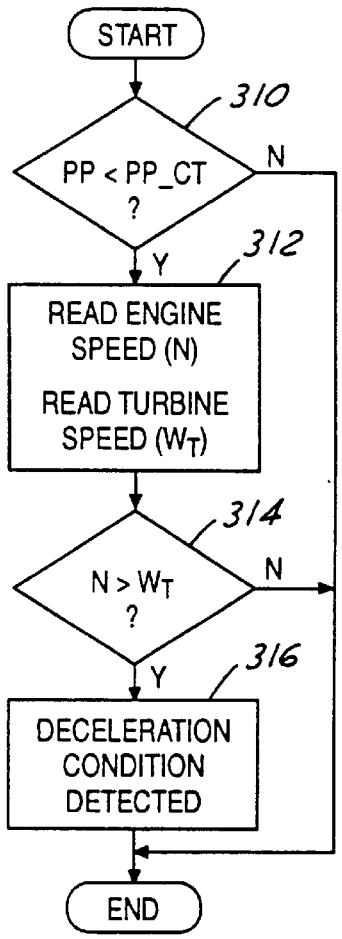

Referring now to FIG. 3, a routine for detecting deceleration conditions is described. First, in step 310, driver actuated pedal position (PP) is compared with calibratable item (PP_CT), which represents the pedal position at which the pedal is closed. Alternatively, driver desired wheel torque, which is known to those skilled in the art to be a function of pedal position and vehicle speed, can be compared with a minimum desired wheel torque clip below which deceleration is desired. When the answer to step 310 is YES, then in step 312, both engine speed (N) and turbine speed (Wt) are read. In step 314, a determination is made as to whether engine speed is greater than turbine speed. When the answer to step 314 is YES, then deceleration conditions have been detected as shown in step 316.

Figure 4:
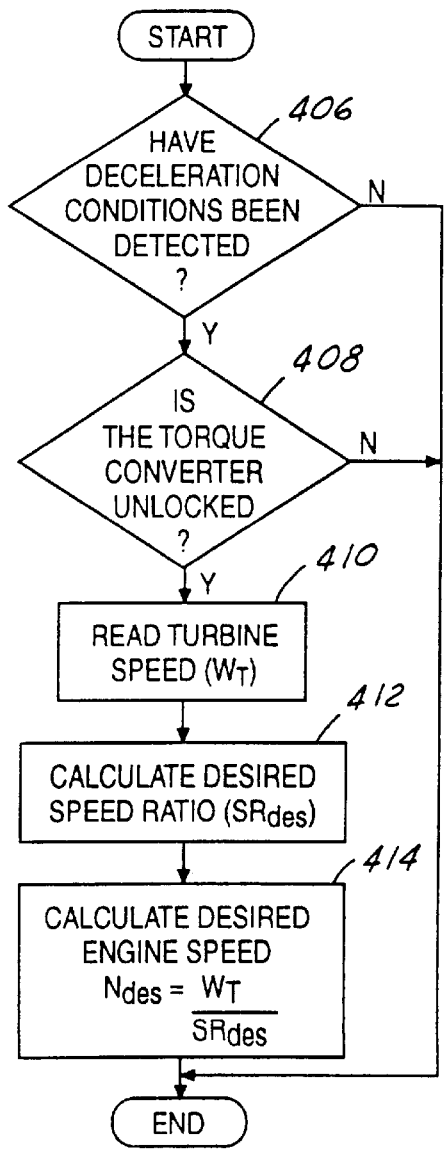

Referring now to FIG. 4, a routine for calculating a desired engine speed during deceleration conditions is described. First, in step 406, a determination is made as to whether deceleration conditions have been detected. When the answer to step 406 is YES, a determination is made in step 408 as to whether the torque converter is in and unlocked state. When the answer to step 408 is YES, turbine speed is read from turbine speed sensor 119 in step 410. Then, in step 412, a desired speed ratio, SRdes, where (SR=Wt/N) is calculated based on the turbine speed. In one embodiment of the present invention, the relationship between desired speed ratio and measured turbine speed is determined so that a small positive constant torque is applied to transmission 16. An example of a relationship between speed ratio and turbine speed that gives a positive constant torque is described later herein with particular reference to FIG. 10. In another embodiment, the relationship between desired speed ratio and measured turbine speed is modified by transmission gear ratio so that a varying positive torque is applied to transmission 16 to give different driveability feel at different vehicle speeds. In this type of system separate relationships are used for each gear when determining the desired speed ratio as a function of measured turbine speed.

According to the present invention, in each embodiment, the desired speed ratio is always less than unity during deceleration when the zero torque point is to be avoided and the torque converter is in an unlocked state. During some conditions engine braking is required, such as, for example, during speed control down a hill. In these cases, the routines described in FIGS. 2–9 are circumvented and other actions are taken. Continuing with FIG. 4, in step 414, the desired engine speed is calculated from the desired speed ratio and the measured turbine speed.

Referring now to FIG. 5, a routine is described for controlling actual engine speed to the desired engine speed calculated in step 414 described previously herein. First, in step 510 actual engine speed (N) is read from sensor 118. Then, in step 512, engine speed error (Werr) is calculated from the desired engine speed (Ndes) and actual engine speed (N). In step 514, a determination is made as to whether engine speed error is greater than zero. When the answer to step 514 is YES, a desired throttle plate angle (qdes) is calculated as a function (f1) of engine speed error. Function f1 is a controller known to those skilled in the art as a PID controller. If the answer to step 514 is NO, then in step 518 desired throttle plate angle (qdes) is calculated as a function (f2) of engine speed error. Function f2 is also a controller known to those skilled in the art as a PID controller. In a preferred embodiment, the gains of function f2 are tuned to allow less overshoot or undershoot than function f1, since positive speed errors are more severe than negative speed errors with respect to crossings of the zero torque point. Further, function f1 is tuned for producing a smooth transition from driver demand based engine torque control and deceleration control according to the present invention. In other words, function f1 is tuned to provide a smooth transition in engine speed and engine torque that gives high customer satisfaction and drive comfort. On the other hand, function f2 is tuned for precise control of engine speed, minimizing zero torque crossings. In an alternative embodiment, the controller defined by function f1 could be used when engine speed is greater than sum of the turbine speed and a calibratable value, with function f2 used otherwise. This would give precise and fast control when engine speed is near the desired engine speed or below the desired engine speed and smooth control when the engine speed is far away from and above the desired engine speed.

Referring now to FIG. 6, a routine is described for controlling throttle position to the desired throttle position calculated in either step 516 or 518 described previously herein. First, in step 610 actual throttle position (TP) is read from sensor 117. Then, in step 612, throttle position error (TPerr) is calculated from the desired throttle position (qdes) and actual throttle position (TP). Output signal DC is calculated as a function (f3) of throttle position error. Function f3 is a controller known to those skilled in the art as a PID controller.

Figure 7:
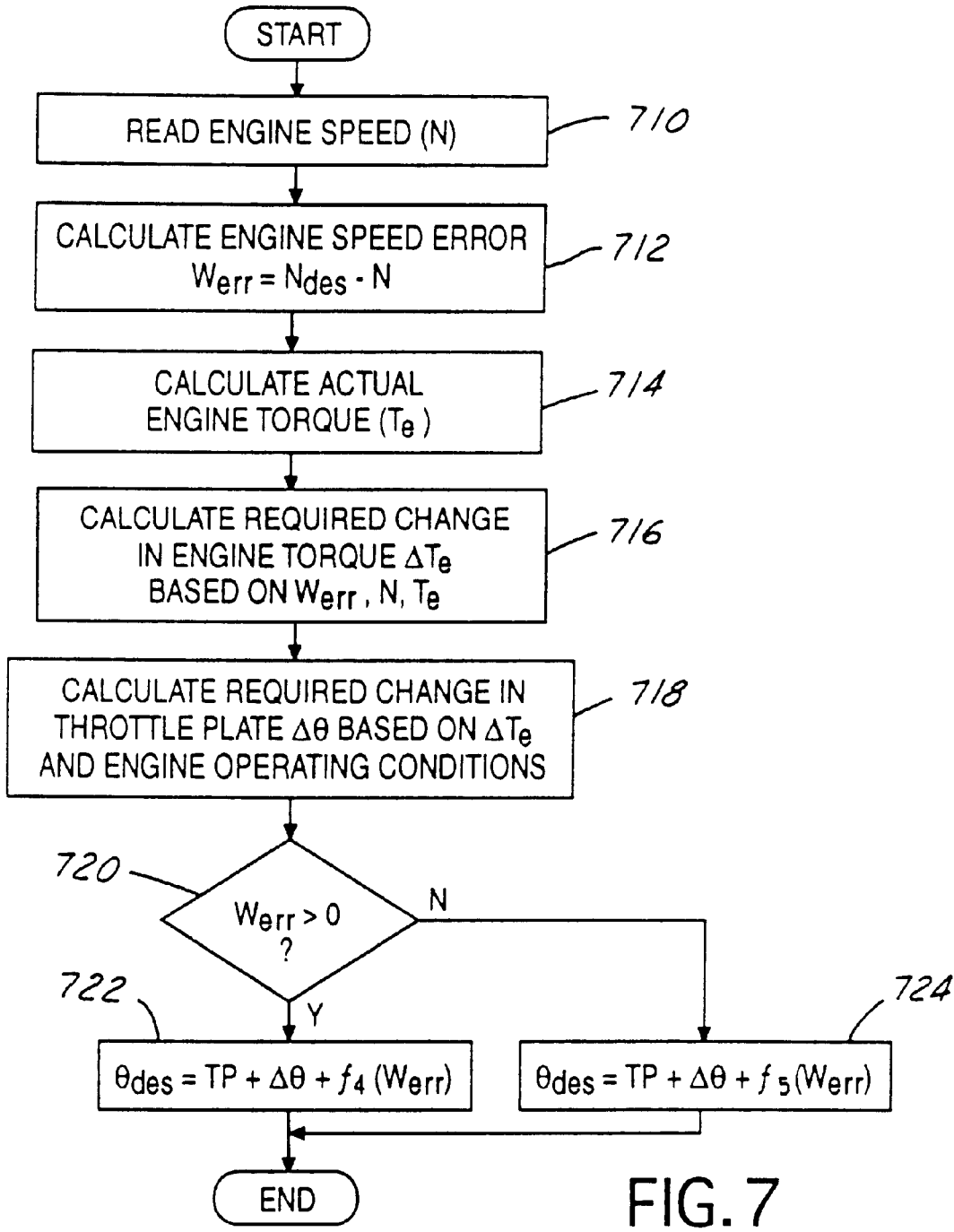

Referring now to FIG. 7, an alternate routine is described for controlling actual engine speed to the desired engine speed calculated in step 414 described previously herein. First, in step 710 actual engine speed (N) is read from sensor 118. Then, in step 712, engine speed error (Werr) is calculated from the desired engine speed (Ndes) and actual engine speed (N). In step 714, actual engine torque (Te) is calculated using methods known to those skilled in the art, such as, for example, using engine speed and turbine speed along with torque converter characteristics. Alternatively, actual engine torque can be calculated based on engine operating conditions such as engine speed, engine airflow, ignition timing, or any other variable known to those skilled in the art to affect engine torque.

Continuing with FIG. 7, in step 716 the required change in engine torque (DTe) to cause actual engine speed to become the desired engine speed is calculated based on engine speed error, engine speed, and actual engine torque. This calculation is completed using characteristic predetermined graphs. Next, in step 718 the required change in throttle position (Dq) is calculated based on the required change in engine torque. The, in step 720 a determination is made as to whether engine speed error is greater than zero. When the answer to step 714 is YES, a desired throttle plate angle (qdes) is calculated as the sum of function (f4) of engine speed error, current throttle position TP, and required change in throttle position. Function f4 is a controller known to those skilled in the art as a PID controller. If the answer to step 714 is NO, then in step 718 desired throttle plate angle (qdes) is calculated as the sum of function (f5) of engine speed error, current throttle position TP, and required change in throttle position. Function f5 is also a controller known to those skilled in the art as a PID controller. In a preferred embodiment, the gains of function f5 are tuned to allow less overshoot or undershoot than function f4, since positive speed errors are more severe than negative speed errors with respect to crossings of the zero torque point.

Referring now to FIG. 8, another alternate routine is described for controlling actual engine speed to the desired engine speed calculated in step 414 described previously herein. First, in step 810 actual engine speed (N) is read from sensor 118. Then, in step 812, engine speed error (Werr) is calculated from the desired engine speed (Ndes) and actual engine speed (N). Then, in step 814, desired engine torque (Tedes) that would produce an actual engine speed equal to the desired engine speed is calculated. The desire torque is calculated taking into account all of the external engine loading, engine friction, and various other losses known to those skilled in the art. In addition, the torque converter load is known from the desired positive torque to be applied to the transmission input shaft and the current torque ratio across the torque. The current torque ratio across the torque converter can be determined based on the actual speed ratio as is known to those skilled in the art. Then in step 816, the desired engine torque is adjusted based on the engine speed error. Finally, in step 818, the desired throttle position is calculated that will proved the adjusted desired engine torque based on engine operating conditions.

In alternative embodiments, any other parameters that affects engine brake (output) torque and is under control of controller 12, such as, for example, ignition angle, cylinder deactivation, fuel injection amount, idle air bypass amount, cam angle of a variable cam angle system, exhaust gas recirculation amount, or accessory loading from accessories such as, for example, the alternator or a/c compressor.

Figure 9:
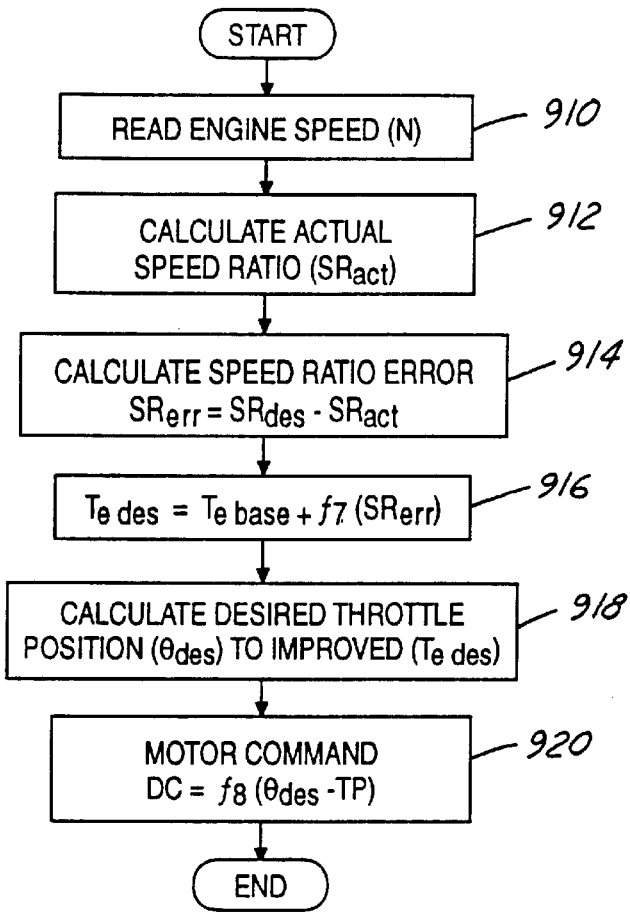

Referring now to FIG. 9, a alternative embodiment of the present invention is described. FIG. 9 is a routine is described for controlling actual speed ratio to the desired speed ratio calculated in step 412 described previously herein. First, in step 910 actual engine speed (N) is read from sensor 118. Then in step 921, actual speed ratio (Sract) is calculated by dividing actual turbine speed by actual engine speed. Then, in step 914, speed ratio error (SRerr) is calculated from the desired speed ratio (SRdes) and actual speed ratio (Sract). In step 916, desired engine torque (Tedes) is calculated as the sum of the base required engine torque (Tebase) and function f7 of speed ratio error. Function f7 is also a controller known to those skilled in the art as a PID controller. Base required engine torque is the base calibration torque for maintaining the engine speed at the desired engine speed.

Continuing with FIG. 9, in step 918 desired throttle position is calculated based on desired engine torque (Tedes) based on current engine conditions such as engine speed and temperature using methods known to those skilled in the art. Then, in step 920, duty cycle sent to motor 67 is calculated using function f8 of desired throttle position minus actual throttle position. In a preferred embodiment, function f8 is a controller known to those skilled in the art as a PID controller.

Alternatively, instead of controlling engine torque directly with throttle position, intermediate values can also be used, such as, for example, engine airflow. for example, from desired engine torque, a desire engine airflow can be calculated. Then, throttle position can then be adjusted so that actual engine airflow as measured by signal MAF approaches the desired engine airflow.

Figure 10:
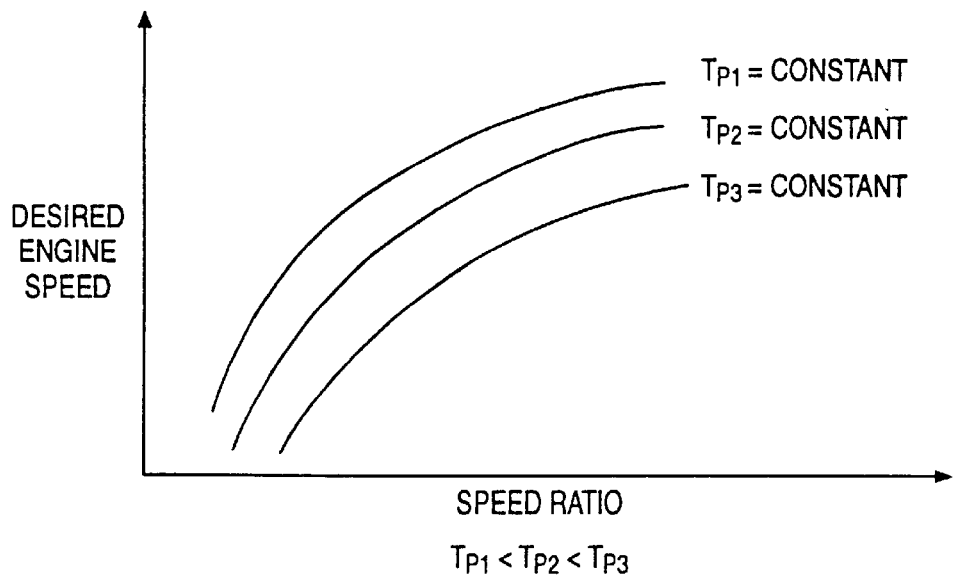
FIG. 10 is a figure describing a relationship between engine speed and torque converter speed ratio used to advantage in the present invention.

Referring now to FIG. 10, a figure showing an example relationship between turbine speed and speed ratio that provides a positive constant torque applied to the shaft 18 of transmission 16.

This concludes the description of the Preferred Embodiment. The reading of it by those skilled in the art would bring to mind many alterations and modifications without departing from the spirit and scope of the invention. For example, if turbine speed is not measured, vehicle speed and gear ratio can be substituted without loss of function. Accordingly, it is intended that the scope of the invention be limited by the following claims.

We claim:

1. A vehicle control method for a vehicle having an internal combustion engine coupled to a torque converter coupled to a transmission, the vehicle driven on the road under conditions where transmission lash is noticeable to the driver, the method comprising the steps of:

indicating when the torque converter is in an unlocked state;

determining torque converter output speed and torque converter input speed;

in response to said indication, when transitioning through zero engine brake torque is to be avoided, adjusting an engine control parameter to maintain said torque converter input speed greater than said torque converter output speed.

2. The method recited in claim 1, wherein said engine control parameter includes throttle position.

3. The method recited in claim 1, wherein said engine control parameter includes ignition angle.

4. The method recited in claim 1, wherein said engine control parameter includes fuel injection amount.

5. The method recited in claim 1, wherein said engine control parameter includes engine torque.

* * * * *